United States Patent
Navratil et al.

(10) Patent No.: US 8,483,133 B2
(45) Date of Patent: Jul. 9, 2013

(54) METHOD AND APPARATUS FOR MULTIPLEXING DIFFERENT TRAFFIC TYPES OVER A COMMON COMMUNICATION SESSION

(75) Inventors: David Navratil, Helsinki (FI); Guillaume Sébire, Espoo (FI); David Hole, North Baddesley (GB)

(73) Assignee: Nokia Corporation, Espoo (FI)

( * ) Notice: Subject to any disclaimer, the term of this patent is extended or adjusted under 35 U.S.C. 154(b) by 149 days.

(21) Appl. No.: 12/933,900

(22) PCT Filed: Mar. 25, 2008

(86) PCT No.: PCT/IB2008/000708
§ 371 (c)(1),
(2), (4) Date: Dec. 20, 2010

(87) PCT Pub. No.: WO2009/118577
PCT Pub. Date: Oct. 1, 2009

(65) Prior Publication Data
US 2011/0103311 A1    May 5, 2011

(51) Int. Cl.
*H04W 4/00* (2009.01)
(52) U.S. Cl.
USPC ........................................................ 370/328
(58) Field of Classification Search
None
See application file for complete search history.

(56) References Cited

U.S. PATENT DOCUMENTS

| 6,683,860 B1* | 1/2004 | Forssell et al. ................. 370/329 |
| 2002/0041583 A1 | 4/2002 | Lintulampi et al. |
| 2009/0137252 A1* | 5/2009 | Masseroni et al. ............ 455/446 |
| 2012/0224479 A1* | 9/2012 | Forssell et al. ................ 370/230 |

FOREIGN PATENT DOCUMENTS

| CN | 1470137 A | 1/2004 |
| EP | 1 041 722 A2 | 10/2000 |
| WO | WO 02/098105 A1 | 12/2002 |
| WO | WO 2007/120107 A2 | 10/2007 |

OTHER PUBLICATIONS

Nokia "RLC Design for GERAN'00" 3GPP TSG GERAN AdHoc #2, Munich, Germany, Oct. 9-13, 2000, pp. 1-5.*
International preliminary report on patentability for corresponding international application No. PCT/IB2008/000708 dated Sep. 28, 2010, pp. 1-8.
International search report and written opinion for corresponding international application No. PCT/IB2008/000708 dated Feb. 2, 2009, pp. 1-15.
Office Action for related African Patent Application No. AP/P/2010/005407, African Regional Intellectual Property Organization (ARIPO), pp. 1-6, Feb. 8, 2013.
Office Action for related Chinese Patent Application No. 200880129364.2, State Intellectual Property Office of the P.R.C. (SIPO), pp. 1-7, dated Dec. 31, 2012.

* cited by examiner

*Primary Examiner* — Anh-Vu Ly
(74) *Attorney, Agent, or Firm* — Ditthavong Mori & Steiner P.C.

(57) ABSTRACT

An approach is provided for providing a reliable transmission of data associated with different traffic types over a common communication session. A temporary block is established between an apparatus and another apparatus. The apparatus multiplexes Radio Link Control (RLC) acknowledged mode data and at least one of RLC unacknowledged mode data and RLC non-persistent mode data. The apparatus then determines to transmit the multiplexed data in the temporary block flow to the other apparatus.

16 Claims, 10 Drawing Sheets

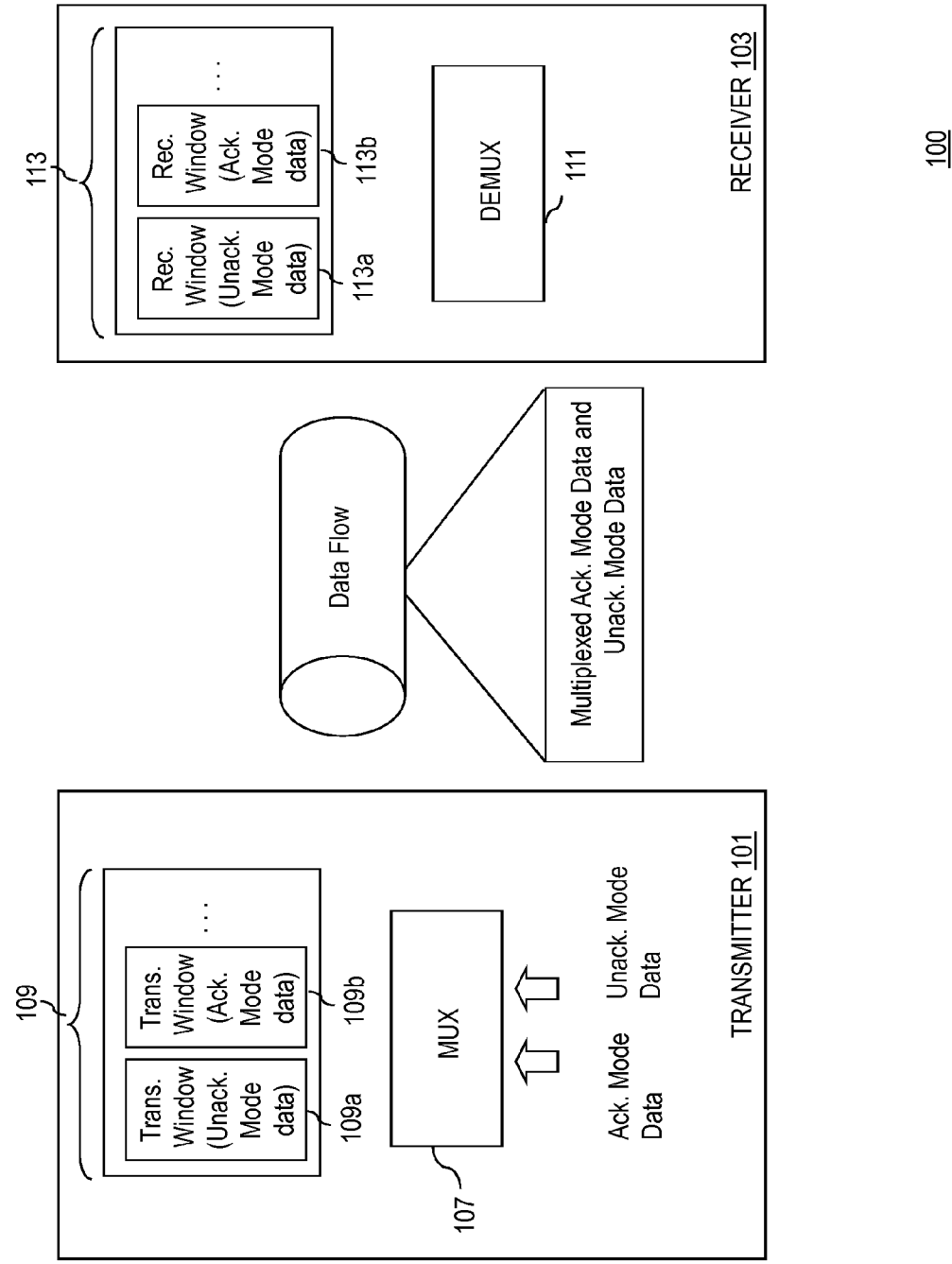

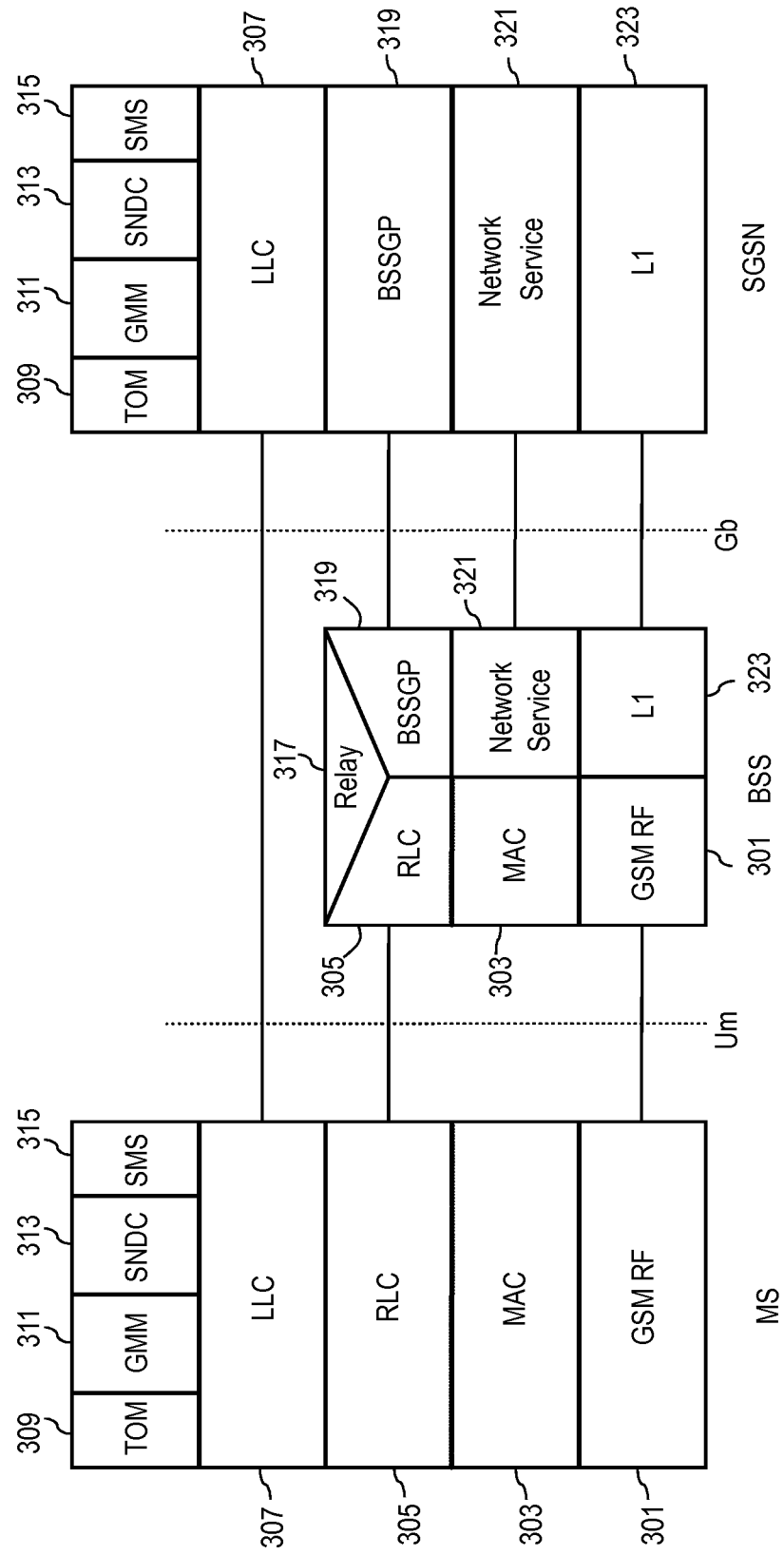

METHOD AND APPARATUS FOR MULTIPLEXING DIFFERENT TRAFFIC TYPES OVER A COMMON COMMUNICATION SESSION

RELATED APPLICATION

This application claims the benefit of the earlier filing date of International Application No. PCT/IB2008/000708 filed Mar. 25, 2008, entitled "Method and Apparatus for Multiplexing Different Traffic Types over a Common Communication Session," the entirety of which is incorporated herein by reference.

BACKGROUND

Radio communication systems, such as a wireless data networks (e.g., Third Generation Partnership Project (3GPP) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves efficient transport of differing traffic types, e.g., traffic that require guaranteed delivery and traffic in which best effort is the delivery mechanism. The use of an acknowledgement mechanism is routinely employed to ensure proper delivery of data.

SOME EXEMPLARY EMBODIMENTS

According to one embodiment of the invention, a method comprises assigning a distinct portion of a common set of sequence numbers to each of a plurality of peer-to-peer connections associated with a single communication session, wherein data blocks corresponding to the peer-to-peer connections are multiplexed over the single communication session. The method also comprises assigning to each of the data blocks of the respective peer-to-peer connections a sequence number within the corresponding portion.

According to another embodiment of the invention, an apparatus comprises a processor configured to assign a distinct portion of a common set of sequence numbers to each of a plurality of peer-to-peer connections associated with a single communication session. Data blocks corresponding to the peer-to-peer connections are multiplexed over the single communication session. The processor is further configured to assign to each of the data blocks of the respective peer-to-peer connections a sequence number within the corresponding portion.

According to another embodiment of the invention, a method comprises receiving, over a single dataflow, multiplexed data representing a first source data and a second source data, wherein the first source data is associated with a first quality of service level, and the second source data is associated with a second quality of service level. A first window and a second window share a common set of sequence numbers for ordering the first source data and the second source data, respectively.

According to yet another embodiment of the invention, an apparatus comprises a demultiplexer configured to demultiplex multiplexed data representing first source data and second source data received over a single common communication session. The first source data requires acknowledgement of receipt of data and is associated with a first window, and the second source data does not require acknowledgement of receipt of data and is associated with a second window. The first window and the second window share a common set of sequence numbers for ordering the first source data and the second source data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a communication system capable of multiplexing unacknowledged mode data and acknowledged mode data, according to various exemplary embodiments of the invention;

FIG. 3 is a diagram of protocols utilized in a General Packet Radio Service (GPRS) system for providing transport of multiplexed data, according to an exemplary embodiment;

DESCRIPTION OF PREFERRED EMBODIMENTS

Figure 2A:
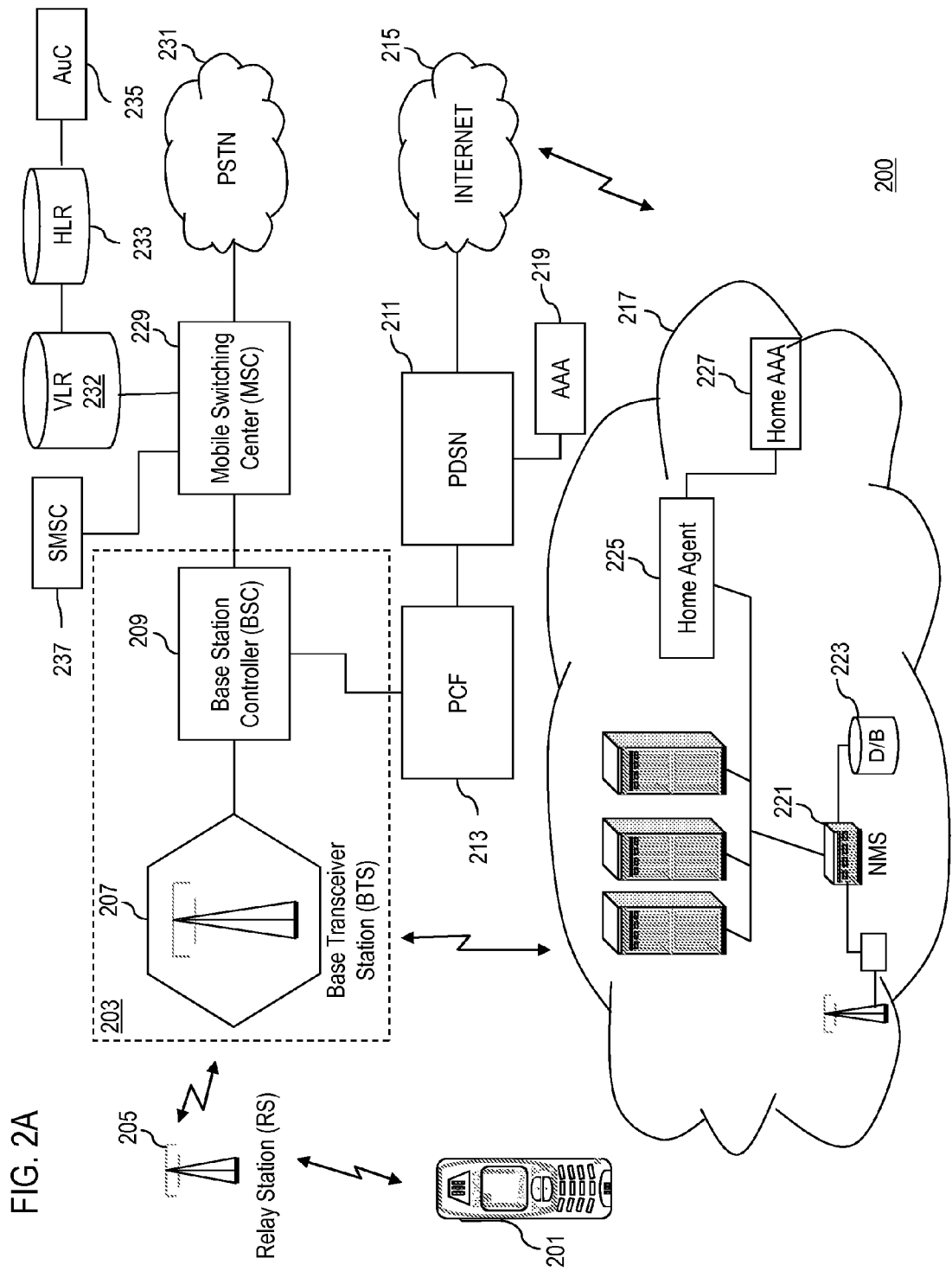
FIGS. 2A and 2B are diagrams of different cellular mobile phone systems capable of supporting various embodiments of the invention.

An apparatus, method, and software for multiplexing different traffic types are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a General Packet Radio Service (GPRS) architecture, it is recognized by one of ordinary skill in the art that the embodiments of the inventions have applicability to any type of communication system and equivalent functional capabilities.

FIG. 1 is a diagram of a communication system capable of multiplexing unacknowledged mode data and acknowledged mode data, according to various exemplary embodiments of the invention. System 100 includes a transmitter 101 configured to establish a communication session (e.g., dataflow) to a receiver 103, whereby the transmitter 101 can multiplex different traffic (or data) types over the dataflow. In an exemplary embodiment, one type of data is that of which the reception is guaranteed and which thus require acknowledgement by the receiver 103 of successful or unsuccessful transmission; such data type is referred to herein as acknowledged mode data (e.g., denoted as "Ack data"). It uses error detection and recovery mechanisms such as ARQ mechanisms where each outstanding data block will be retransmitted upon request from the receiver until acknowledged by the receiver. Another data type (e.g., denoted as "Unack data") is that which does not need acknowledgement and thus of which the reception is not guaranteed—i.e., unacknowledged mode data which does not use error recovery (e.g. using ARQ mechanism), or non-persistent data which uses error detection and some level of error recovery (e.g. using ARQ mechanism) to increase robustness of the data transmission where each outstanding data block may be retransmitted upon request from the receiver. Such different data types can correspond to e.g. control signalling and user data.

As seen, the transmitter 101 includes a multiplexer (MUX) 107 that multiplexes the acknowledged mode data and unacknowledged mode data. According to one embodiment, the different data types can be effectively multiplexed because of the use of a split sequence number space 109, within which exists a transmission window 109a for unacknowledged mode data and another transmission window 109b for acknowledged mode data. The set of sequence numbers can be that of those traditionally used to support a single peer-to-peer connection. The concept dividing this common set of sequence number space is more fully described below with respect to FIGS. 5 and 6.

On the receiving side, a demultiplexer (DEMUX) 111 within the receiver 103 permits proper separation of the multiplexed data received from the transmitter 101. To properly manage the acknowledgement signaling, the receiver 103 also utilizes a counterpart split sequence number space 113 within which exist a reception window 113a for unacknowledged mode data and reception window 113b for acknowledged mode data.

In one embodiment, the transmission window (response reception window) of size N allows the transfer of data blocks (each identified with a separate sequence number) using acknowledged mode between two peers such that: 1) at any given time at most N in-sequence data blocks can be outstanding (i.e., in transit) in the window, 2) a new in-sequence data block may be transmitted and become outstanding if and only if strictly less than N data blocks are contained in the transmit window, and 3) only the first block in the window can be removed from the window upon which the window is advanced so the next in-sequence block becomes the first block in the window.

It is contemplated that either one of the transmitter 101 or the receiver 103 can be mobile station or base station. As used herein, a mobile stations (MS) or user equipment can include handsets, terminals, stations, units, devices, or any type of interface to the user (such as "wearable" circuitry, etc.).

By way of example, the system 100 is a cellular system, such as a General Packet Radio Service (GPRS) system. It is contemplated that other GPRS-base systems (e.g., enhanced GPRS (EGPRS)) can utilize the multiplexing approach of system 100. In traditional GPRS systems, the multiplexing of acknowledged mode data and unacknowledged mode data concurrently over a single data flow (TBF) is not supported.

To better appreciate the multiplexing approach of system 100, the architectures of two exemplary cellular systems are explained.

Figure 2B:
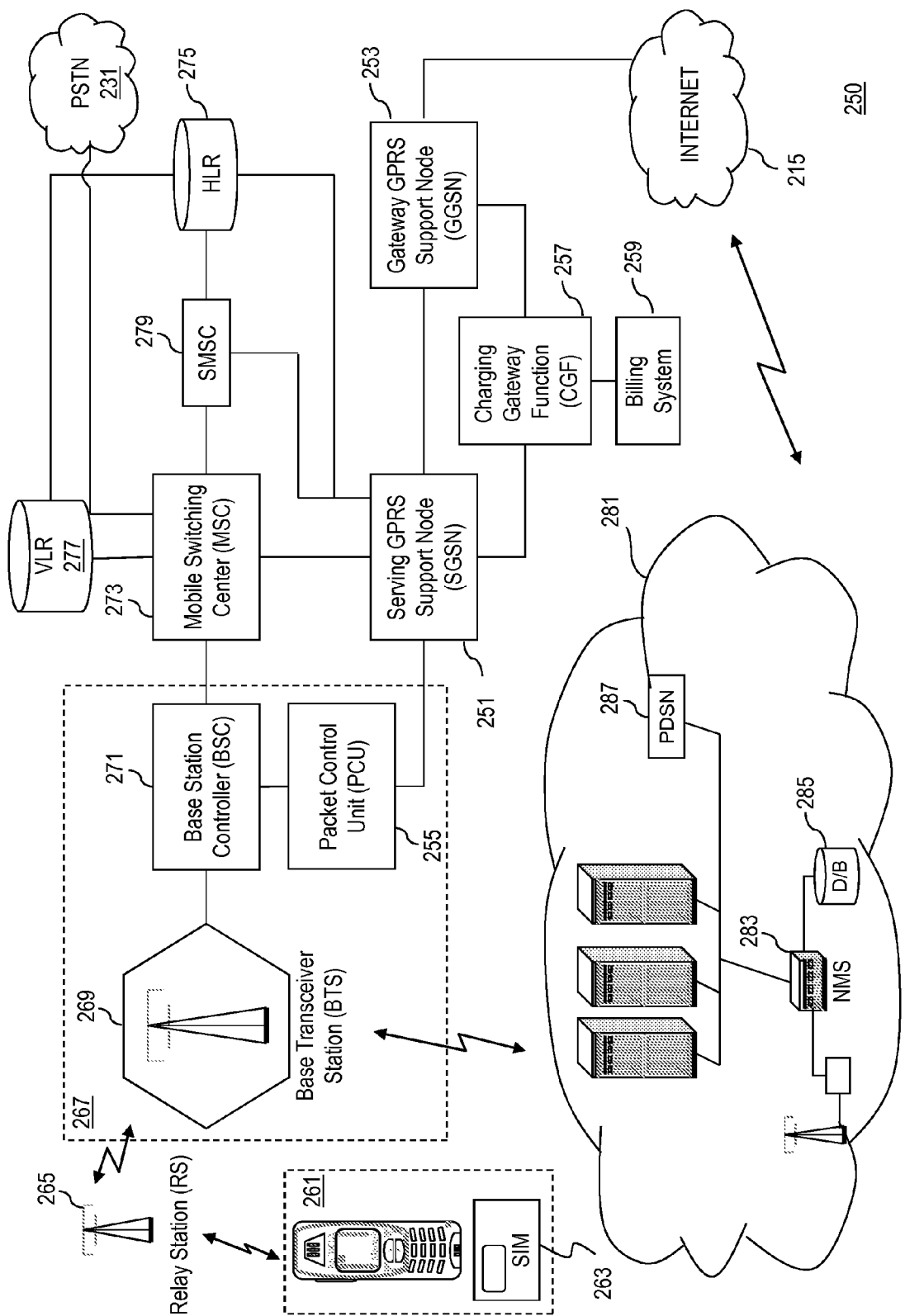

FIGS. 2A and 2B are diagrams of different cellular mobile phone systems capable of supporting various embodiments of the invention. FIGS. 2A and 2B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). For the purposes of explanation, the carrier and channel selection capability of the radio network is explained with respect to a Global System for Mobile Communication (GSM) architecture.

A radio network 200 includes mobile stations 201 (e.g., handsets, terminals, stations, units, devices, or any type of interface to the user (such as "wearable" circuitry, etc.)) in communication with a Base Station Subsystem (BSS) 203 through a relay station (RS) 205. According to one embodiment of the invention, the radio network supports GSM services.

In this example, the BSS 203 includes a Base Transceiver Station (BTS) 207 and Base Station Controller (BSC) 209. Although a single BTS 207 is shown, it is recognized that multiple BTSs are typically connected to the BSC 209 through, for example, point-to-point links. Each BSS 203 is linked to a Packet Data Serving Node (PDSN) 211 through a transmission control entity, or a Packet Control Function (PCF) 213. Since the PDSN 211 serves as a gateway to external networks, e.g., the Internet 215 or other private consumer networks 217, the PDSN 211 can include an Access, Authorization and Accounting system (AAA) 219 to securely determine the identity and privileges of a user and to track each user's activities. The network 217 comprises a Network Management System (NMS) 221 linked to one or more databases 223 that are accessed through a Home Agent (HA) 225 secured by a Home AAA 227.

Although a single BSS 203 is shown, it is recognized that multiple BSSs 203 are typically connected to a Mobile Switching Center (MSC) 229. The MSC 229 provides connectivity to a circuit-switched telephone network, such as the Public Switched Telephone Network (PSTN) 231. Similarly, it is also recognized that the MSC 229 may be connected to other MSCs 229 on the same network and/or to other radio networks. The MSC 229 is generally collocated with a Visitor Location Register (VLR) 232 database that holds temporary information about active subscribers to that MSC 229. The data within the VLR 232 database is to a large extent a copy of the Home Location Register (HLR) 233 database, which stores detailed subscriber service subscription information. In some implementations, the HLR 233 and VLR 232 are the same physical database; however, the HLR 233 can be located at a remote location accessed through, for example, a Signaling System Number 7 (SS7) network.

An Authentication Center (AuC) 235 containing subscriber-specific authentication data, such as a secret authentication key, is associated with the HLR 233 for authenticating users.

Furthermore, the MSC 229 is connected to a Short Message Service Center (SMSC) 237 that stores and forwards short messages to and from the radio network 200.

During typical operation of the cellular telephone system, BTSs 207 receive and demodulate sets of reverse-link signals from sets of mobile units 201 conducting telephone calls or other communications. Each reverse-link signal received by a given BTS 207 is processed within that station. The resulting data is forwarded to the BSC 209. The BSC 209 provides call resource allocation and mobility management functionality including the orchestration of soft handoffs between BTSs 207. The BSC 209 also routes the received data to the MSC 229, which in turn provides additional routing and/or switching for interface with the PSTN 231. The MSC 229 is also responsible for call setup, call termination, management of inter-MSC handover and supplementary services, and collecting, charging and accounting information. Similarly, the radio network 200 sends forward-link messages. The PSTN 231 interfaces with the MSC 229. The MSC 229 additionally interfaces with the BSC 209, which in turn communicates with the BTSs 207, which modulate and transmit sets of forward-link signals to the sets of mobile units 201.

As shown in FIG. 2B, the two key elements of the General Packet Radio Service (GPRS) infrastructure 250 are the Serving GPRS Supporting Node (SGSN) 251 and the Gateway GPRS Support Node (GGSN) 253. In addition, the GPRS infrastructure includes a Packet Control Unit (PCU) 255 and a Charging Gateway Function (CGF) 257 linked to a Billing System 259. A GPRS the Mobile Station (MS) 261 employs a Subscriber Identity Module (SIM) 263. Under this scenario, a relay station (RS) 265 provides extended coverage for the MS 261. A BSS 267 includes a BTS 269, a BSC 271, and a PCU 255.

The PCU 255 is a logical network element responsible for GPRS-related functions such as air interface access control, packet scheduling on the air interface, and packet assembly and re-assembly. Generally the PCU 255 is physically integrated with the BSC 271; however, it can be collocated with the BTS 269 or the SGSN 251. The SGSN 251 provides equivalent functions as the MSC 273 including mobility management, security, and access control functions but in the packet-switched domain. Furthermore, the SGSN 251 has connectivity with the PCU 255 through, for example, a Frame Relay-based interface using the BSS GPRS protocol (BSSGP), which is more fully described below with respect to FIG. 3. Although only one SGSN 251 is shown, it is recognized that that multiple SGSNs 251 can be employed and can divide the service area into corresponding routing areas (RAs). A SGSN/SGSN interface allows packet tunneling from old SGSNs to new SGSNs when an RA update takes place during an ongoing Packet Data Protocol (PDP) context. While a given SGSN 251 may serve multiple BSCs 271, any given BSC 271 generally interfaces with one SGSN 251.

Also, the SGSN 251 is optionally connected with the HLR 275 through an SS7-based interface using GPRS enhanced Mobile Application Part (MAP) or with the MSC 273 through an SS7-based interface using Signaling Connection Control Part (SCCP). A Visitor Location Register (VLR) 277 database that stores information about active subscribers of the MSC 273. The SGSN/HLR interface allows the SGSN 251 to provide location updates to the HLR 275 and to retrieve GPRS-related subscription information within the SGSN service area. The SGSN/MSC interface enables coordination between circuit-switched services and packet data services such as paging a subscriber for a voice call. Finally, the SGSN 251 interfaces with a SMSC 279 to enable short messaging functionality over the network 250.

The GGSN 253 is the gateway to external packet data networks, such as the Internet 215 or other private customer networks 281. The network 281 comprises a Network Management System (NMS) 283 linked to one or more databases 285 accessed through a PDSN 287. The GGSN 253 assigns Internet Protocol (IP) addresses and can also authenticate users acting as a Remote Authentication Dial-In User Service host. Firewalls located at the GGSN 253 also perform a firewall function to restrict unauthorized traffic. Although only one GGSN 253 is shown, it is recognized that a given SGSN 251 may interface with one or more GGSNs 253 to allow user data to be tunneled between the two entities as well as to and from the network 250. When external data networks initialize sessions over the GPRS network 250, the GGSN 253 queries the HLR 275 for the SGSN 251 currently serving a MS 261.

The BTS 269 and BSC 271 manage the radio interface, including controlling which Mobile Station (MS) 261 has access to the radio channel at what time. These elements essentially relay messages between the MS 261 and SGSN 251. The SGSN 251 manages communications with an MS 261, sending and receiving data and keeping track of its location. The SGSN 251 also registers the MS 261, authenticates the MS 261, and encrypts data sent to the MS 261.

Although the above cellular systems are described, it is contemplated that the multiplexing approach of system 100 can be adapted to other wireless (e.g., non-cellular) systems.

FIG. 3 is a diagram of protocols utilized in a General Packet Radio Service (GPRS) system for providing transport of multiplexed data, according to an exemplary embodiment. For the purposes of explanation, the protocol stack is explained with respect to the system 250 of FIG. 2B. The mobile station 261 communicates with a serving GPRS support node (SGSN) 251 via a base station subsystem (BSS) 267 for transferring data to, for instance, an external data network. Radio interface Um exists between the mobile station 261 and the BSS 267, and a Gb interface supports communication between the BSS 267 and the SGSN 251.

As seen in FIG. 3, the MS 261 includes a physical layer protocol 301, such as a GSM radio frequency (RF) protocol. The physical link layer 301 provides the services and functions that are required to transfer information over the air interface Um. These functions can include modulation/demodulation, coding, framing, synchronization, monitoring of radio quality, power control procedures, interleaving, congestion detection, and transmission error detection and correction. Additionally, the protocol stack of the MS 261 includes a Medium Access Control (MAC) layer 303, a Radio Link Control (RLC) layer 305, and a Logical Link Control (LLC) layer 307. Upper layer protocols include Tunnelling of Messages (TOM) 309, GPRS Mobility Management (GMM) 311, SubNetwork Dependent Convergence (SNDC) 313, and Short Message Service (SMS) 315.

The Medium Access Control (MAC) layer 303 controls access to system radio resources by the MS 261. The Radio Link Control (RLC) layer 305 is responsible for data transmission over the physical layer 301 of the GPRS radio interface. A reliable link between the MS 261 and the base station system is established with the RLC layer 305. Peer RLC entities may operate in acknowledged mode, non-persistent mode or unacknowledged mode. In order to exchange data (user/control) between the MS 261 and the network in one direction (uplink, or downlink), the MAC layer 303 establishes a temporary block flow (layer 2 link) between this MS 261 and the network, which allows the transfer of RLC data blocks between peer RLC entities (in the direction from the network to the MS 261 for a downlink TBF, and from the MS 261 to the network for an uplink TBF). A TBF can support the multiplexing of data from multiple higher layer (LLC) flows, provided that each of these said higher layer flows require the peer RLC entities to operate using the same RLC mode (acknowledged/unacknowledged/non-persistent). In this case, multiplexing is indicated by the link layer SAPI (Service Access Point Identifier), and there is only one pair of RLC entities per MAC-layer TBF (i.e., one on the transmitting side, one on the receiving side).

The LLC layer 307 is responsible for the creation of a logical link between the mobile station 261 and the SGSN 251 and responsible for the transfer of the signaling and data transfer. The LLC layer 307 provides a logical link between the MS 261 and the SGSN 251 and supports such functions as ciphering, flow control and sequence control. As previously mentioned, LLC layer 307 supports both acknowledged and unacknowledged data transfers. In acknowledged mode, LLC layer 307 provides detection and recovery of transmission errors. The protocol multiplexes several possible connections of the network layer into a single logical connection of the LLC layer 307 and compresses and decompresses user data and headers.

An LLC layer connection is identified by a data link connection identifier (DLCI), which includes a service access point (SAP) Identifier (SAPI) and the MS's Temporary Logical Link Identifier (TLLI). Received packets are mapped into an LLC Service Access Point Identifier (SAPI) according to characteristics of the packets (e.g., based on the Quality of Service (QoS)). The LLC SAPI can operate in the ACK and/or UNACK LLC mode. GMM 311 and SMS 315 are associated with other dedicated SAPIs. According to certain embodiments, LLC SAPIs are mapped to a single TBF; also, one RLC entity and flow can be multiplexed to a logical channel.

The SNDC 313 controls the transfer of user data network layer protocol data units (N-PDUs) between the MS 261 and SGSN 251. The SNDC 313 performs mapping and compression functionalities between the network layers and lower layers, as well as segmentation/de-segmentation of information to and from the lower LLC layer 307.

The BSS 267 likewise supports GSM RF 301, MAC 303 and RLC to communicate with the MS 261. In addition, the BSS 267 can provide a relay function 317 and utilize the following protocols to interact with the SGSN 251: BSS GPRS Application Protocol (BSSGP) 319, Network Service protocol 321, and Layer 1 (L1) protocol 323. BSSGP provides management of routing and information at the required quality of service (QoS) between BSS 267 and SGSN 251. The Network Service protocol 321 supports data transfer, as well as provide network congestion indication and status indication.

The SGSN 251 correspondingly includes the following protocols: BSSGP 319, Network Service protocol 321, and Layer 1 (L1) protocol 323. In addition, the SGSN 251 utilizes protocols to communicate with the MS 261: Logical Link Control (LLC) layer 307, TOM 309, GMM 311, SNDC 313, and SMS 315. Direct communication between the MS 261 and the SGSN 251 is provided by the SNDC 313 and LLC 307. In the SNDC protocol layer, the user data can be segmented into one or more SNDC data units, whereby the user data and associated header fields can be compressed. The SNDC data units are transmitted in LLC frames, to which address and verification information essential for data transmission is added; and in which frames the SNDC data units can be encrypted. The task of the LLC layer is to maintain the data transmission connection between the MS 261 and the serving support node SGSN 251 and to provide retransmission.

The SGSN 251 routes data packets from the MS 261 onto the proper gateway support node GGSN (not shown). This connection uses a tunneling protocol (GTP, GPRS Tunneling Protocol) that encapsulates and tunnels all user data and signaling transmitted through the GPRS core network.

It is recognized that a mobile station that does not support multiple TBF procedures can multiplex upper layer PDUs (i.e., LLC PDUs) on one TBF, provided that the same RLC mode (i.e., acknowledged, unacknowledged, or non-persistent) is used for all these upper layer PDUs. For example, GPRS mobility management (GMM) signalling requires the TBF to operate in RLC acknowledged mode. Therefore, multiplexing of GMM signalling and user data can be accomplished if the user data also requires the TBF to use RLC acknowledged mode. LLC PDUs are multiplexed using SAPI identifiers (as detailed in 3GPP TS 44.064 (which is incorporated herein by reference in its entirety).

However, as mentioned, it is not possible to multiplex data sent using different RLC modes (RLC Ack, RLC Unack, and RLC non-persistent mode) on the same TBF. Neither the network nor the mobile station is allowed to change the RLC mode of an existing TBF. Therefore, to transmit data using a different RLC mode requires the release of the existing TBF and the establishment of a new TBF: this would potentially cause unacceptable delays and data loss to the application using the existing TBF.

The problem stems from the introduction of RLC non-persistent mode for point-to-point connection and other features that make the support of conversational services over GSM EDGE Radio Access Network (GERAN) feasible. The user-perceived performance of these particular services is highly sensitive to delay and data loss, and the break in transmission required to temporarily establish a new TBF to transmit data using RLC acknowledged mode (e.g., for signaling data) would not be acceptable.

Although the multiple TBF feature (see 3GPP TS 44.060, which is incorporated herein by reference in its entirety) can address this problem, this is a complex feature that may require significant architectural modifications. By contrast, the system 100 provides multiplexing of both acknowledged mode data and unacknowledged mode data over a single TBF, as next explained.

Figure 4:
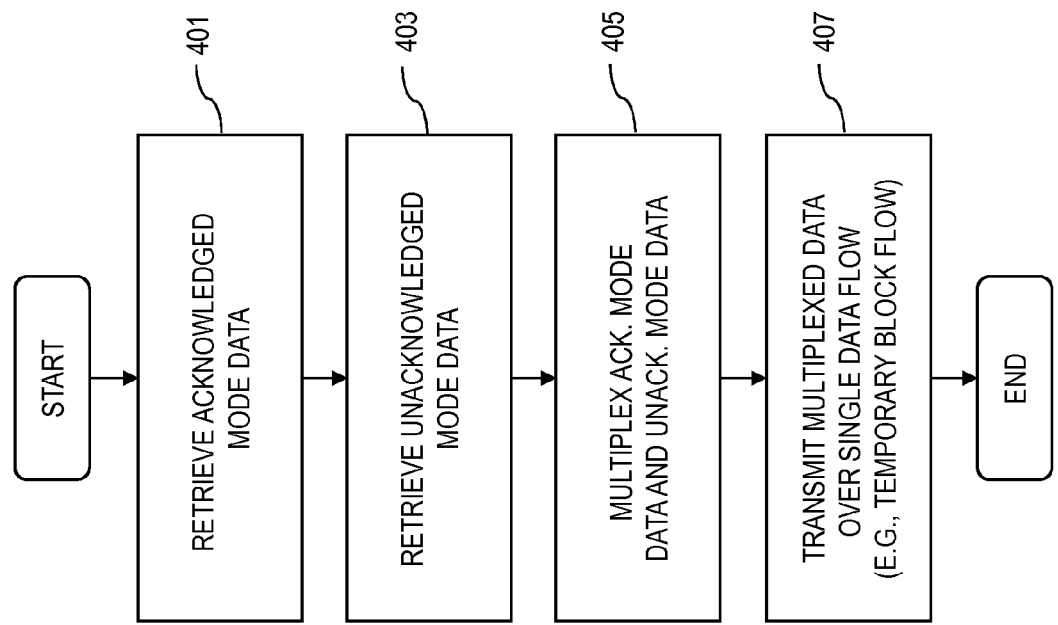
FIG. 4 is a flowchart of a multiplexing process, in accordance with an embodiment of the invention.

FIG. 4 is a flowchart of a multiplexing process, in accordance with an embodiment of the invention. This multiplexing process provides reliable transmission of data in RLC acknowledged mode concurrently with data not using RLC acknowledged mode on a single TBF without releasing and reestablishing the TBF. Also, the process need not require the establishment of parallel TBFs in the same direction. This process is explained with respect to the system 100 of FIG. 1.

As shown, in steps 401 and 403, the multiplexer 107 of the transmitter 101 retrieves acknowledged mode data as well as unacknowledged or non-persistent mode user data (referred to as unacknowledged mode data) from the buffer 105. Next, the retrieved data are multiplexed, as in step 405. Thereafter, the transmitter 101 transmits, per step 407, the multiplexed data over a single data flow, such as a TBF in the GPRS system 250 of FIG. 2B.

In one embodiment, the multiplexing of unacknowledged mode data (e.g., user data) and acknowledged mode data (e.g., GMM signalling data) is provided by splitting the sequence number space (SNS) used for numbering of RLC data blocks into two parts, as described below.

Figure 5:
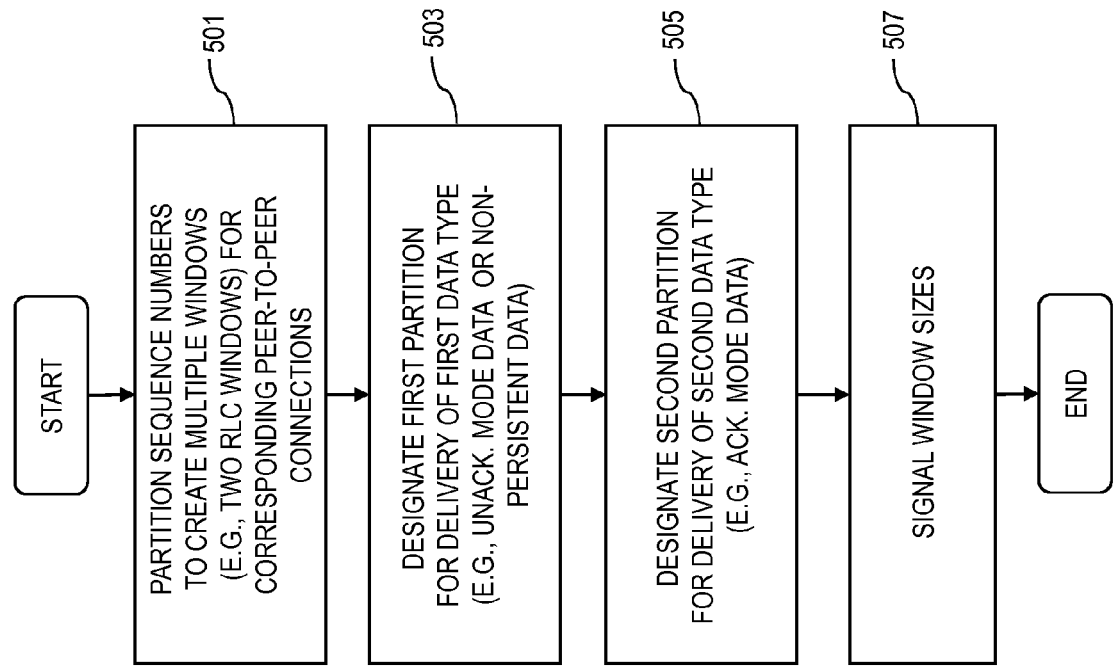
FIG. 5 is a flowchart of a process for partitioning sequence number space (SNS) to transport multiplexed data, in accordance with an embodiment of the invention.

FIG. 5 is a flowchart of a process for partitioning sequence number space (SNS) to transport multiplexed data, in accordance with an embodiment of the invention. As previously described, the RLC transmitter 101 and receiver 103 operate with two RLC windows, one window for data transmission in RLC unacknowledged mode (e.g., 109a and 113a, respectively) and other window for data transmission in RLC acknowledged mode (e.g., 109b and 113b, respectively). In this example, the data transmission is over a peer-to-peer connection, such as TBF. The process permits, within the same sequence number space (SNS), some data to be sent in acknowledged mode and some in unacknowledged mode on the same TBF. To this end, the process of FIG. 5 splits the sequence number space (SNS) into two parts and uses two transmission windows. However, it is contemplated that the SNS can be partitioned into more than two parts to effectively provide two or more windows corresponding to different data types (e.g., varying quality of service (QoS) traffic).

Accordingly, in step 501, a sequence number space is partitioned to allow the creation of two non-overlapping windows (e.g., RLC windows). In other words, the process assigns a distinct portion (i.e., non-overlapping segments) of the common set of sequence numbers to, for instance, respective peer-to-peer connections associated with a single communication session, wherein data blocks corresponding to the peer-to-peer connections are multiplexed over the single communication session. Each of the data blocks of the respective peer-to-peer connections a sequence number within the corresponding portion. The first partition is designated, per step 503, for unacknowledged mode data/non-persistent mode data—i.e., no guarantee of delivery. The process designates the second partition for delivery of acknowledged mode data—i.e., guaranteed delivery (step 505). The first window 109a, for example, is used for the transfer of RLC data blocks in the RLC unacknowledged/non-persistent mode. The second window 109b can provide a guaranteed delivery window used for the transfer of RLC data blocks requiring guaranteed delivery (acknowledged mode data). In an exemplary embodiment, state variables associated with the guaranteed delivery window 109b are updated according to the rules applicable for RLC acknowledged mode. The RLC receiver 103 identifies whether an RLC data block should be reliably received based on its block sequence number (BSN).

For instance, RLC data blocks from the first window 109a (unacknowledged mode) are transmitted with block sequence numbers from the first part of the SNS, and RLC data blocks from the second window 109b (acknowledged mode) are transmitted with BSN from the second part. At the receiver 103, the BSN included in the header of an RLC/MAC block for data transfer thus unambiguously indicates whether the RLC data block is transmitted in RLC unacknowledged/non-persistent mode or RLC acknowledged mode.

In order for the receiver 103 to identify the RLC mode in use for a given RLC data block based on the BSN of that data block, the receiver 103 must know the sequence number space portions reserved for the windows 109a and 109b. These portions can be of fixed size or of adjustable size. In the latter case, step 507, the size of each of the windows 109a, 109b is conveyed to the receiver 103. To minimize the amount of information (bits) required to signal the window size, the following approach can be used, according to certain embodiments. For example, window sizes are restricted to $2^n$ for integer values of n. The value of n for each window ($n_1$ and $n_2$) is indicated to the mobile station either directly or by mean of lookup table. The part of SNS used for the first window (unacknowledged/non-persistent mode data) can range from 0 to $(2^{(n_1+1)}-1)$; the second part of SNS ranges from (SNS-$2^{(n_2+1)}$) to (SNS-1). Alternatively, (applicable particularly if the unacknowledged mode data requires a high bandwidth), only the size of the second (smaller) window size is restricted to $2^n$ for some integer value of n. This SNS over which the window operates then ranges from (SNS-$2^{(n+1)}$) to (SNS-1); the first part of SNS then extends from 0 to (SNS-$2^{(n+1)}$-1). It is noted also that in EGPRS and EGPRS2, the SNS ranges from 0 to 2047, allowing a block sequence number (BSN) to take a value within that range, whereby this sequence number space can be used, according to one embodiment Traditionally, in EGPRS and EGPRS2 when multiple RLC data blocks are sent within a RLC/MAC block for data transfer and thus within a single radio block, only the first complete BSN is sent; subsequent BSNs are indicated relative to the first BSN (e.g., 3GPP TS 44.060, subclause 10.4.12). One approach requires that blocks be ordered according to their relative position in the window (so that "older" blocks are sent first). However, it is noted this does not necessarily prevent multiplexing of blocks.

For example, where 2 RLC/MAC blocks are sent from different windows, the existing rules are changed: the difference (modulo SNS) between the first and second blocks' BSN is less than 1024. Consequently, whether the first block is from the first window or the second window depends only on the relative values of the BSNs associated with the two blocks.

Similarly, in the case of 3 or 4 RLC/MAC blocks being sent in one radio block from different windows, the window from which the first block is sent depends on the relative BSNs of the three blocks. However, it may nonetheless be infeasible to use the existing coding to specify exactly the three BSNs; in this case, the transmitter can use a lower coding scheme and send fewer blocks.

Figure 6:
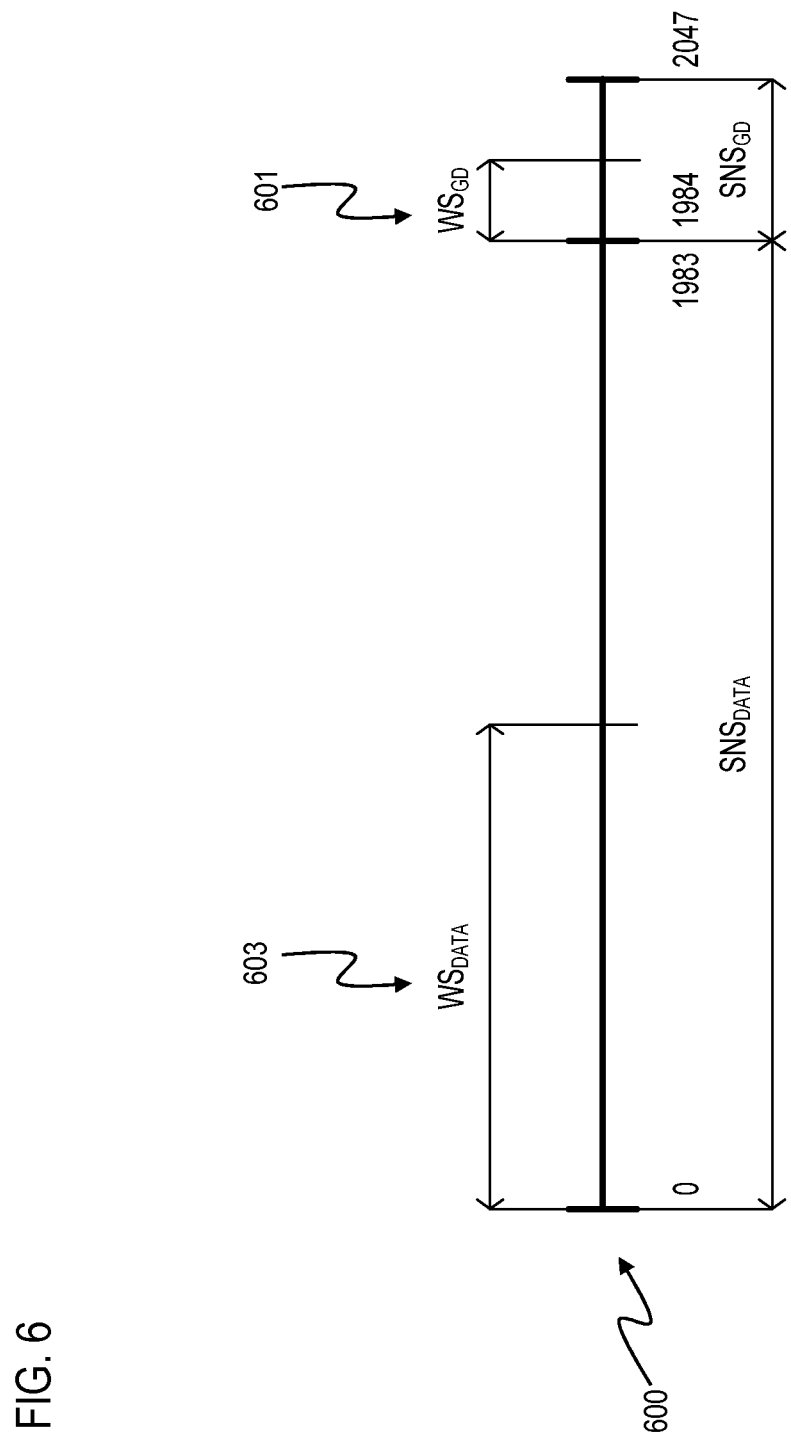
FIG. 6 is a diagram showing partitioning of sequence numbers to create multiple windows used to transport multiplexed data, according to an exemplary embodiment.

FIG. 6 is a diagram showing partitioning of sequence numbers to create multiple windows used to transport multiplexed data, according to an exemplary embodiment. In this example, the sequence number space (SNS) 600 ranges from 0 to 2047; also, it is assumed that the amount of RLC data blocks requiring the guaranteed delivery is not high. Therefore the guaranteed delivery window 601 can be smaller ($WS_{GD}$) than the window 603 used for data transfer in the RLC unacknowledged/non-persistent mode ($WS_{DATA}$). This scenario reflects the situation when SNS for unacknowledged/non-persistent mode data is 0 to 1983, and SNS for acknowledged mode data starts at 1984 and continue to 2047.

According to certain embodiments, the maximum RLC window of size 1024 blocks can be assigned to one window. In the example, the size of $WS_{GD}$ is 32. This size of $WS_{GD}$ allows transmission an upper layer PDU (GMM signalling) of 704 octets using MCS-1 without stalling, assuming there are no blocks pending acknowledgment.

Figure 7:
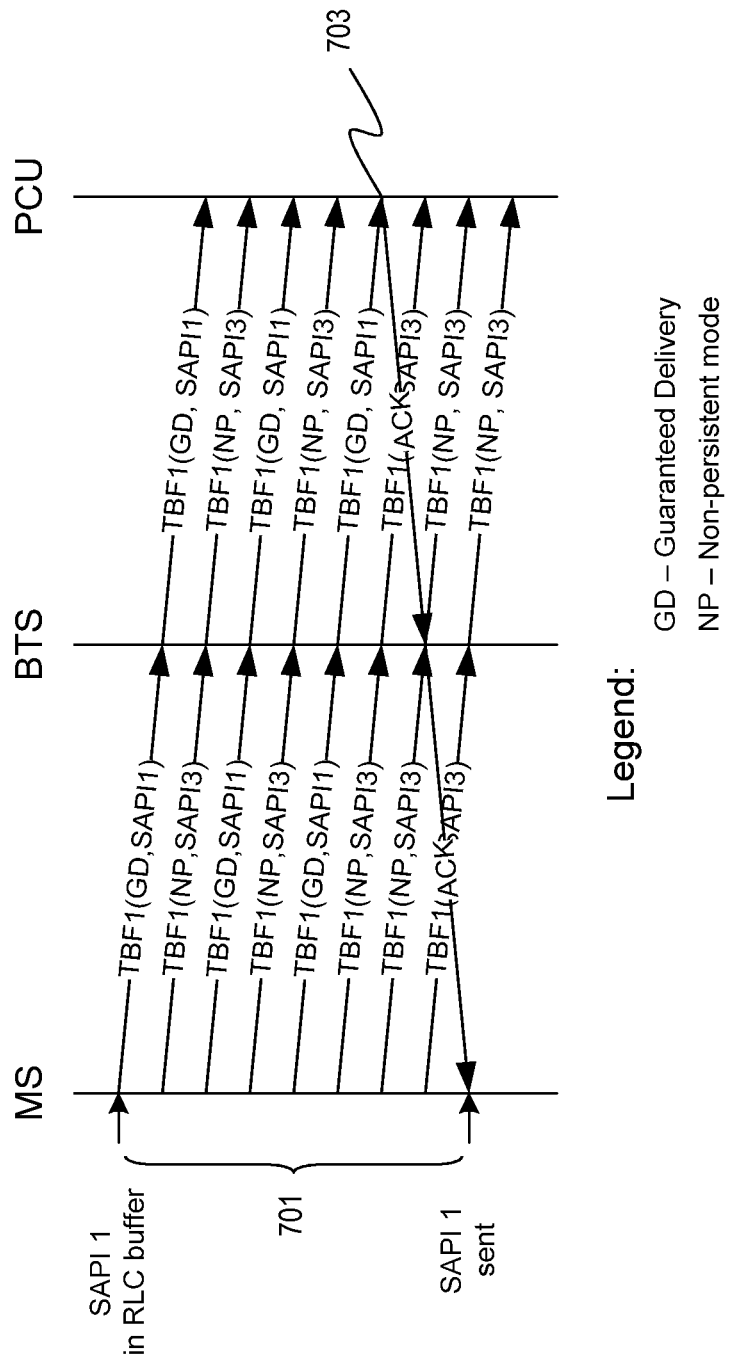
FIG. 7 is a ladder diagram showing the transmission of multiplexed data, according to an exemplary embodiment.

FIG. 7 is a ladder diagram showing the transmission of multiplexed data, according to an exemplary embodiment. The process of multiplexing the different data types can impact the scheduling policies on the RLC data block transmission. In this example, acknowledged mode data can include GMM signalling transmission. The transmitter, which may include two RLC engines and a scheduler, has to manage incoming data from two windows. An additional scheduling rule is accordingly defined to multiplex RLC data blocks from the two windows.

According to one embodiment, it is assumed that the RLC non-persistent mode is used for voice services. A user application, e.g., a Voice over Internet Protocol (VoIP) client, generates a block of data in fixed intervals, e.g., 20 ms. Therefore, it can be also assumed that the RLC non-persistent window regularly contains some RLC data blocks. When a GMM message (SAPI 1) arrives to RLC, the message is inserted to a guaranteed delivery buffer. The example lengths of GMM and SM messages are shown in Tables 1 and 2 below (further details are provided in 3GPP TS 24.008, which is incorporated herein by reference in its entirety). As can be seen from Tables 1 and 2, the GMM messages are rather short and can fit in one RLC data block in most cases. On the other hand, the SM messages are longer and their length can, in some cases, exceed 500 octets.

TABLE 1

| Message | Length [octets] |
| --- | --- |
| Attach request | 91 |
| Attach accept | 142 |
| Attach complete | 42 |
| Attach reject | 6 |
| Detach request | 15 |
| Detach accept | 2 |
| Routing area update request | 113 |
| Routing area update accept | 182 |
| Routing area update complete | 61 |
| Routing area update reject | 7 |
| P-TMSI reallocation command | 19 |
| P-TMSI reallocation complete | 2 |
| Authentication and ciphering request | 40 |
| Authentication and ciphering response | 33 |
| Authentication and ciphering reject | 2 |
| Authentication and ciphering failure | 19 |
| Identity request | 3 |
| Identity response | 12 |
| GMM status | 3 |
| GMM information | 26 |

TABLE 2

| Message | Length [octets] |
| --- | --- |
| Activate PDP context request | 396 |
| Activate PDP context accept | 298 |
| Activate PDP context reject | 257 |
| Active secondary PDP context request | 535 |
| Active secondary PDP context accept | 278 |
| Active secondary PDP context reject | 257 |
| Request PDP context activation | 377 |
| Request PDP context activation reject | 257 |
| Modify PDP context request NW to MS | 555 |
| Modify PDP context request MS to NW | 533 |
| Modify PDP context accept MS to NW | 257 |
| Modify PDP context accept NW to MS | 280 |
| Modify PDP context Reject | 257 |
| Deactivate PDP context request | 511 |
| Deactivate PDP context accept | 509 |
| Request secondary PDP context Activation | 533 |
| Request secondary PDP context Act Reject | 257 |
| SM Status | 4 |

The RLC data blocks from the two windows (e.g., windows 109a and 109b of FIG. 1) share the available radio resources allocated for the TBF. It is noted that the RLC non-persistent window 109a can contain data that is sensitive to the transfer delay as well as the Frame Error Rate (FER). The approaches, according to certain embodiments, include priority transmission, fair queuing, and first-in first-out (FIFO).

With priority transmission, RLC data blocks in the guaranteed delivery window have higher priority. The transmitter 101 transmits the negatively acknowledged blocks from the guaranteed delivery window 109b first. The priority queuing approach is suitable if the frequency of signalling messages is low and the messages are short. In case of large signalling messages, there can be an interruption in the transmission of user data, which could cause problems at the application layer.

As for the fair queuing approach, the transmitter 101 examines the two windows 109a, 109b in a round robin fashion, taking into the account only negatively acknowledged blocks. The throughput is evenly distributed between the two windows 109a, 109b if there are any negatively acknowledged RLC data blocks in both of them. If the signalling messages are short and infrequent, then the difference between the priority transmission and the fair queuing is negligible. For large signalling messages, the degradation in application FER would be dependent on the allocated throughput. It is noted that the transfer time of signalling messages can be longer in comparison to the priority transmission.

Regarding the FIFO approach, a single buffer is used, and LLC frames are delivered in the order in which they are received. Retransmissions are performed on a similar basis— i.e., the oldest "NACKed" block is transmitted first. This suggests that the block with the lowest SN is literally the "oldest." That is, the block was received by the RLC layer first. The FIFO scheduling of LLC frames can also have a negative impact on the user data depending on transfer time constraints and the length of signalling messages. The performance of this approach from the application FER point of view is between the priority transmission and the fair queuing.

For the purposes of illustration, packet exchange between a MS (e.g., MS 261 of FIG. 2B) and a PCU (e.g., PCU 255) is described when fair queuing is used. Under this scenario, a single dataflow, e.g., TBF1, carries both acknowledged mode data (i.e., guaranteed delivery (GD)), and unacknowledged mode data or non-persistent (NP) mode data. In particular, acknowledged mode data is represented by SAPI1, and NP data as SAPI3. As seen in FIG. 7, multiplexed data is transmitted to the BTS 269 and then PCU 255 (step 701). In step 703, the PCU 255 responds to an acknowledgement message for the received acknowledged mode data, SAPI1. The acknowledgment information is delivered to the MS 261, which is the RLC transmitter, through the use of traditional Ack/Nack (acknowledgement/negative acknowledgement) messages or a Piggy-Backed Acknowledgement (PAN) field.

It is noted that if the TBF is allocated sufficient radio resources, then any degradation in frame error rate (FER) at the application layer should not occur. The network may increase the allocation if RLC data block with BSN belonging to the guaranteed delivery window is received.

The transmission of acknowledgement messages (e.g., Packet Ack/Nack messages such as EGPRS PACKET DOWNLINK ACK/NACK, EGPRS PACKET DOWNLINK ACK/NACK TYPE 2) is under the network's control, or under the network's order (e.g. PACKET UPLINK ACK/ NACK). According to one embodiment, the mobile station 261 can determine which RLC connection to report from the BSN(s), which are included in the RLC/MAC header carrying the poll, the report being generated for the RLC connection to which the BSN(s) correspond according to the multiplexing rules described above. In this case, an EGPRS RLC/ MAC block for data transfer conveys only RLC data blocks from one window to indicate the particular window that should be reported in the packet Ack/Nack message.

The RLC endpoint transmitter determines which of the RLC connections is being reported on using the starting sequence number (SSN) included in the Packet Ack/Nack message. Alternatively, the format of Packet Ack/Nack messages may be changed so the message includes more than one SSN and more than one reported bitmap. In this case, if the Packet Ack/Nack message is sent in the response to a poll the Packet Ack/Nack message includes the reported bitmap(s) for all RLC connections for which RLC data blocks were received in the radio block containing the poll; otherwise, the Packet Ack/Nack message includes a reported bitmap for one window.

If a TBF is assigned with SSN-based Fast Ack/Nack Reporting (FANR), the FANR is applicable only to one window in case the piggybacked Ack/Nack (PAN) field contains only the least significant bits of SSN. The SSN-based FANR may be applicable to both windows if the PAN filed includes SSN or an indication what window is reported is included in either RLC/MAC header or the PAN field. When FANR is intended to be used only for one window, the window may be implicitly identified by the RLC mode (i.e., FANR can be used for non-persistent mode if no-persistent and acknowledge mode are used; FANR is not used for unacknowledged mode) or the window utilizing FANR may be explicitly indicated in an assignment messages. However, if an uplink TBF is assigned with Time-based FANR, Ack/Nack information provided in the downlink may be used to update the status of RLC data blocks in both windows.

According to an exemplary embodiment, a countdown procedure is used to indicate the current number of remaining RLC data blocks for the TBF; further details are provided in 3GPP TS 44.060. Two approaches for countdown value calculation are now explained. Firstly, the countdown value may reflect a total number of RLC data blocks (both acknowledged mode data and unacknowledged mode data) that are to be currently transmitted. Secondly, the countdown value may reflect only a total number of RLC data blocks to be transmitted in one window, either acknowledged mode data (e.g., GMM signalling) or unacknowledged mode data (e.g., user data). In this case, the RLC/MAC header contains the countdown value for the part to which the RLC data block(s) belongs. As mentioned above, in this case, only RLC data blocks from one part can be included in one EGPRS RLC/MAC block for data transfer.

The above approach to multiplexing unacknowledged mode data with acknowledged mode data on a single TBF allows a mobile station (not supporting multiple TBFs operation) to deliver data for services with different reliability requirements on the transport layer, i.e., unreliable transmission in unacknowledged mode or non-persistent mode and reliable transmission in acknowledged mode. Such data transport can be performed without service interruption.

Figure 8:
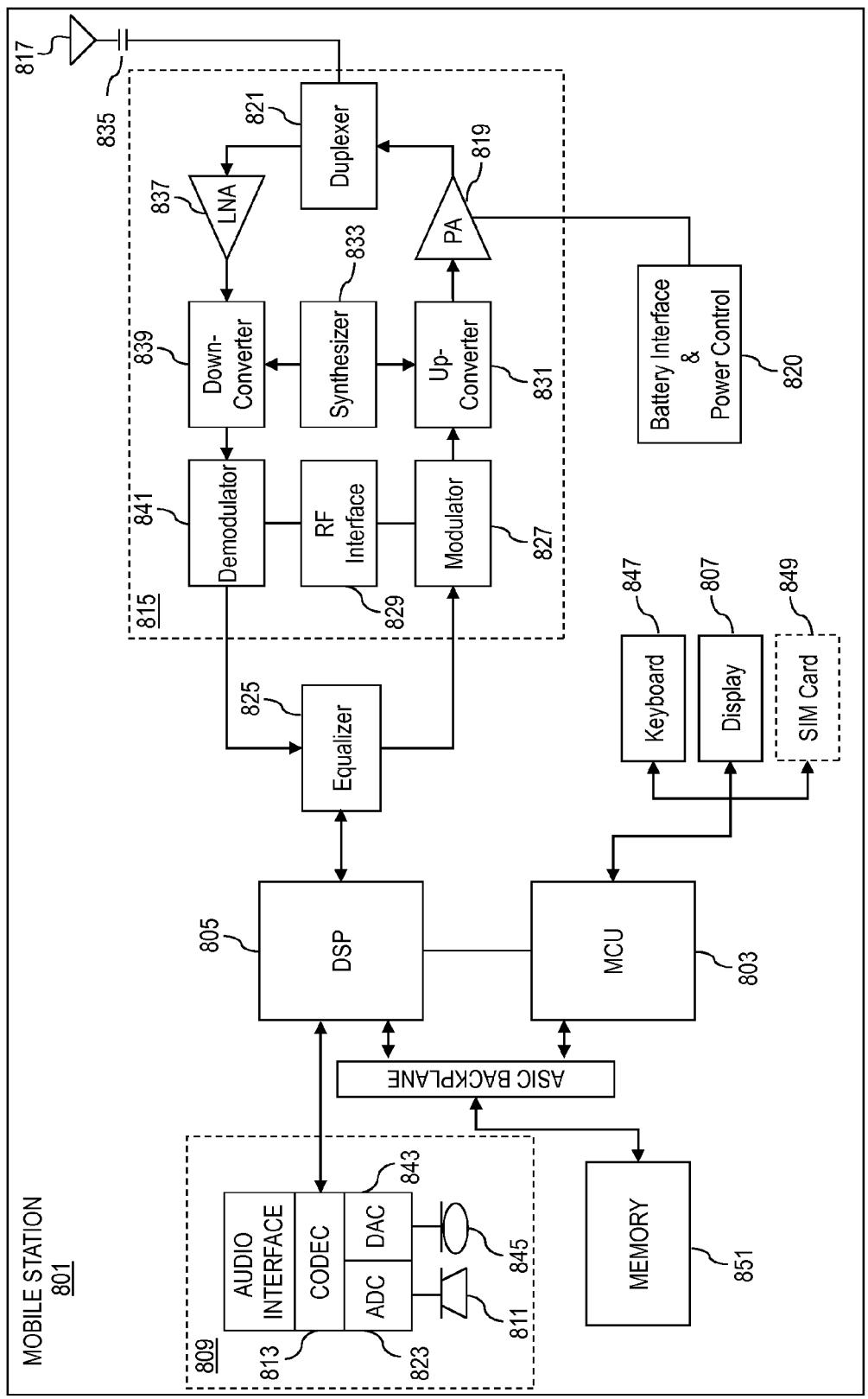
FIG. 8 is a diagram of exemplary components of a mobile station capable of operating in the systems of FIGS. 2A and 2B, according to an embodiment of the invention.

FIG. 8 is a diagram of exemplary components of a mobile station (e.g., handset) capable of operating in the systems of FIGS. 2A and 2B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system (e.g., system of FIG. 2), via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In the exemplary embodiment, the processed voice signals are encoded, by units not separately shown, using GSM protocols.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The MCU 803 delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

One of ordinary skill in the art would recognize that the processes for multiplexing may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 9.

Figure 9:
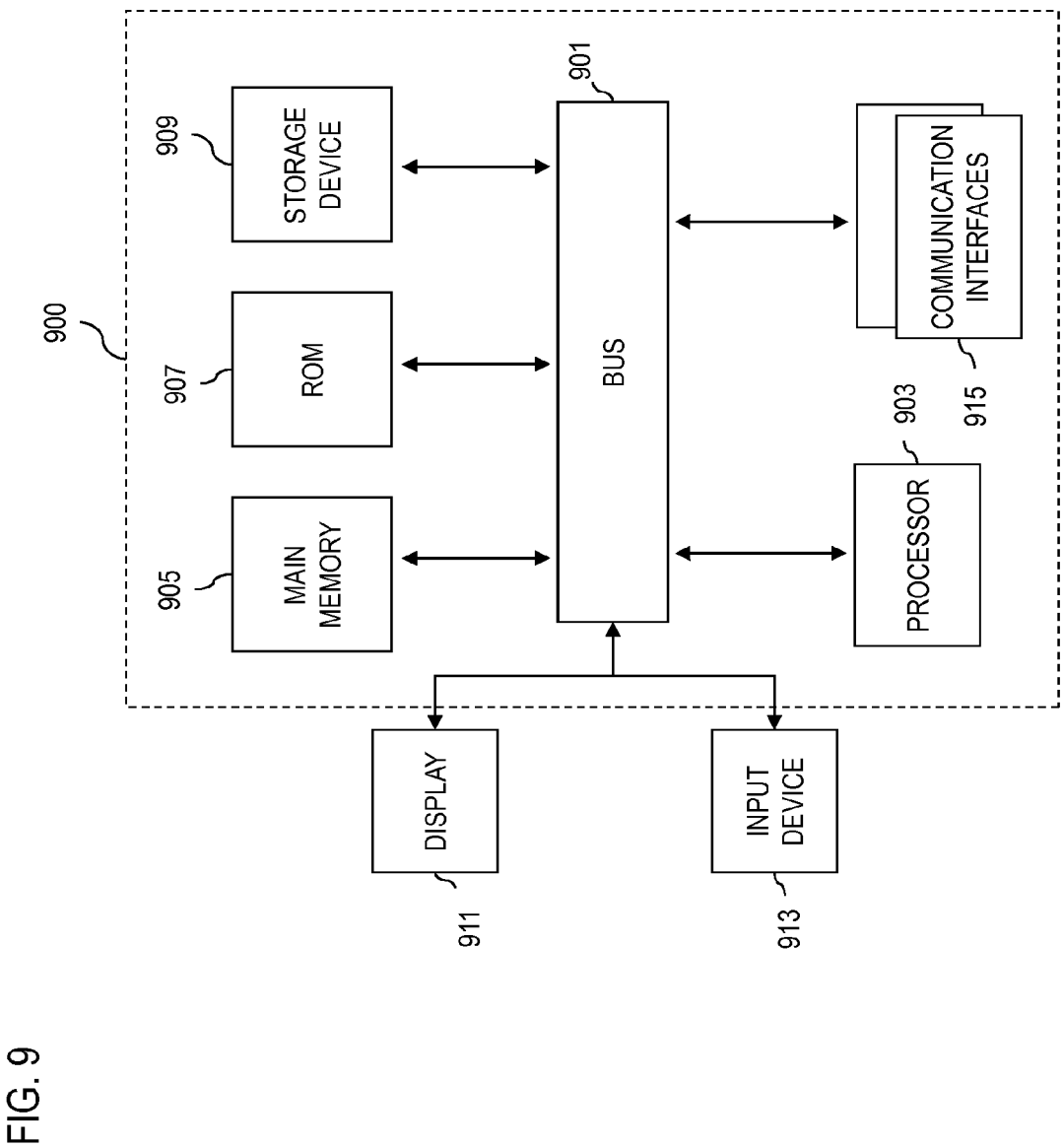
FIG. 9 is a diagram of hardware that can be used to implement an embodiment of the invention.

FIG. 9 illustrates exemplary hardware upon which various embodiments of the invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to establish a temporary block flow between an apparatus and another apparatus;
   multiplexing, by the apparatus, Radio Link Control (RLC) acknowledged mode data and at least one of RLC unacknowledged mode data and RLC non-persistent mode data; and
   determining to transmit the multiplexed data in the temporary block flow to the other apparatus without releasing the temporary block flow, after sending the RLC acknowledged mode data and before sending the at least one of the RLC unacknowledged mode data and the RLC non-persistent mode data.

2. A method of claim 1, wherein the acknowledged mode data and the at least one of the RLC unacknowledged mode data and the RLC non-persistent mode data correspond to respective peer-to-peer connections.

3. A method of claim 1, further comprising:
   determining to generate the RLC acknowledged mode data and the at least one of the RLC unacknowledged mode data and the RLC non-persistent mode data based, at least in part, on one or more reliability requirements.

4. A method of claim 1, wherein the temporary block flow is established over either an uplink or a downlink of a General Packet Radio Service (GPRS) system.

5. An apparatus comprising:
   a processor configured to determine to establish a temporary block flow between the apparatus and another apparatus;
   a multiplexer configured to multiplex Radio Link Control (RLC) acknowledged mode data and at least one of RLC unacknowledged mode data and RLC non-persistent mode data; and
   a transceiver configured to transmit the multiplexed data in the temporary block flow to the other apparatus without releasing the temporary block flow, after sending the RLC acknowledged mode data and before sending the at least one of the RLC unacknowledged mode data and the RLC non-persistent mode data.

6. An apparatus of claim 5, wherein the acknowledged mode data and the at least one of the RLC unacknowledged mode data and the RLC non-persistent mode data correspond to respective peer-to-peer connections.

7. An apparatus of claim 5, wherein the processor is further configured to determine to generate the RLC acknowledged mode data and the at least one of the RLC unacknowledged mode data and the RLC non-persistent mode data based, at least in part, on one or more reliability requirements.

8. An apparatus of claim 5, wherein the temporary block flow is established over either an uplink or a downlink of a General Packet Radio Service (GPRS) system.

9. A method comprising:
   determining to establish a temporary block flow between an apparatus and another apparatus;
   receiving multiplexed data in the temporary block flow from the other apparatus without releasing the temporary block flow, after receiving RLC acknowledged mode data and before receiving the at least one of RLC unacknowledged mode data and RLC non-persistent mode data; and
   demultiplexing, by the apparatus, radio link control acknowledged mode data and at least one of radio link control unacknowledged mode data and radio link control non-persistent mode data from the multiplexed data.

10. A method of claim 9, wherein the acknowledged mode data and the at least one of the RLC unacknowledged mode data and the RLC non-persistent mode data correspond to respective peer-to-peer connections.

11. A method of claim 9, wherein the RLC acknowledged mode data and the at least one of the RLC unacknowledged mode data and the RLC non-persistent mode data are generated based, at least in part, on one or more reliability requirements.

12. A method of claim 9, wherein the temporary block flow is established over either an uplink or a downlink of a General Packet Radio Service (GPRS) system.

13. An apparatus comprising:
   a processor configured to determine to establish a temporary block flow between an apparatus and another apparatus; and
   a transceiver configured to receive multiplexed data in the temporary block flow from the other apparatus without releasing the temporary block flow, after receiving RLC acknowledged mode data and before receiving the at least one of RLC unacknowledged mode data and RLC non-persistent mode data; and
   a demultiplexer configured to demultiplex radio link control acknowledged mode data and at least one of radio link control unacknowledged mode data and radio link control non-persistent mode data from the multiplexed data.

14. An apparatus of claim 13, wherein the acknowledged mode data and the at least one of the RLC unacknowledged mode data and the RLC non-persistent mode data correspond to respective peer-to-peer connections.

15. An apparatus of claim 13, wherein the RLC acknowledged mode data and the at least one of the RLC unacknowledged mode data and the RLC non-persistent mode data are generated based, at least in part, on one or more reliability requirements.

16. An apparatus of claim 13, wherein the temporary block flow is established over either an uplink or a downlink of a General Packet Radio Service (GPRS) system.

* * * * *